(12) United States Patent　(10) Patent No.: US 8,542,692 B2
Cai et al.　(45) Date of Patent: Sep. 24, 2013

(54) CENTRALIZED TELECOM SERVER FOR DIFFERENT TECHNOLOGY NETWORKS

(75) Inventors: Yigang Cai, Naperville, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 223 days.

(21) Appl. No.: 12/895,267

(22) Filed: Sep. 30, 2010

(65) Prior Publication Data

US 2012/0082165 A1　Apr. 5, 2012

(51) Int. Cl.
*H04L 12/28*　(2006.01)

(52) U.S. Cl.
USPC .......................................................... 370/401

(58) Field of Classification Search
None
See application file for complete search history.

(56) References Cited

U.S. PATENT DOCUMENTS

| | | | |
|---|---|---|---|
| 7,653,192 B1 * | 1/2010 | Sylvain | 379/202.01 |
| 2008/0261593 A1 * | 10/2008 | Wong et al. | 455/435.1 |
| 2009/0113460 A1 * | 4/2009 | Parrish et al. | 719/328 |
| 2009/0296694 A1 * | 12/2009 | Kalyanpur et al. | 370/352 |
| 2011/0295646 A1 * | 12/2011 | Barros | 705/7.26 |

OTHER PUBLICATIONS

Study on Architecture Impacts of Service Brokering (Release 8), 3GPP TR 23.810 V8.0.0, 3GPP, Available Sep. 24, 2008.*

* cited by examiner

*Primary Examiner* — Dang Ton
*Assistant Examiner* — Ronald H Davis
(74) *Attorney, Agent, or Firm* — Duft Bornsen & Fettig, LLP

(57) ABSTRACT

Systems and methods are disclosed for providing service management across different technology networks. A centralized telecom serving system (TSS) includes a plurality of interface gateways, a central adapter, and a common interface. When in operation, a first interface gateway receives a first service request from a first network, and converts the first service request from a signaling interface used in the first network to the common interface. The central adapter receives the first service request over the common interface, and processes service management logic to identify multiple services that trigger on the first service request and determine a sequence for providing the multiple services. For each service, the central adapter generates a second service request in the common interface, and transmits the second service request to a second interface gateway that is coupled to a second network.

11 Claims, 12 Drawing Sheets

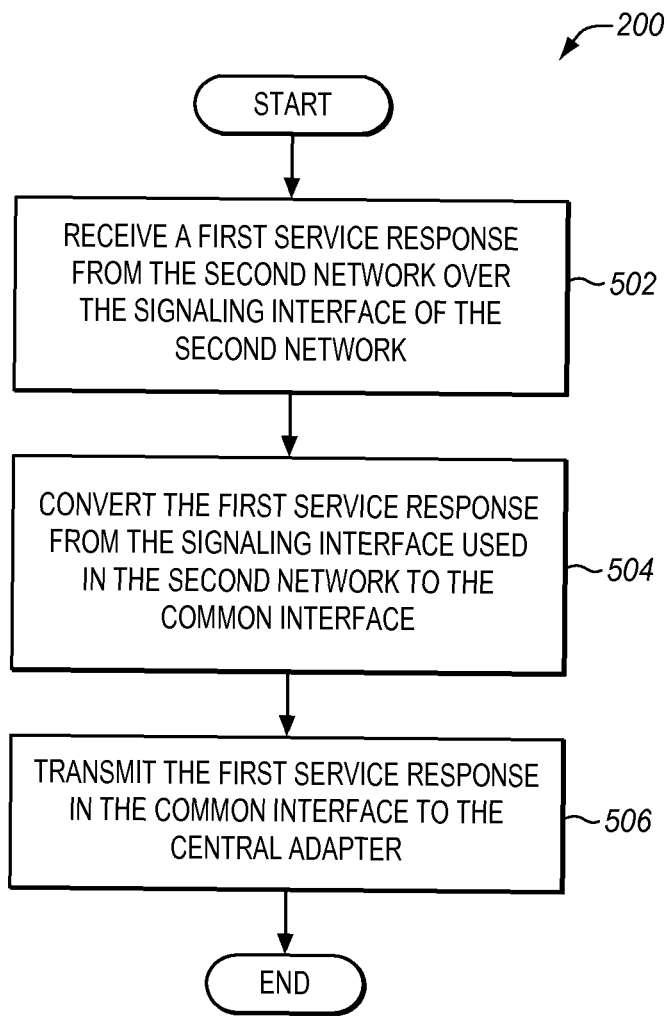

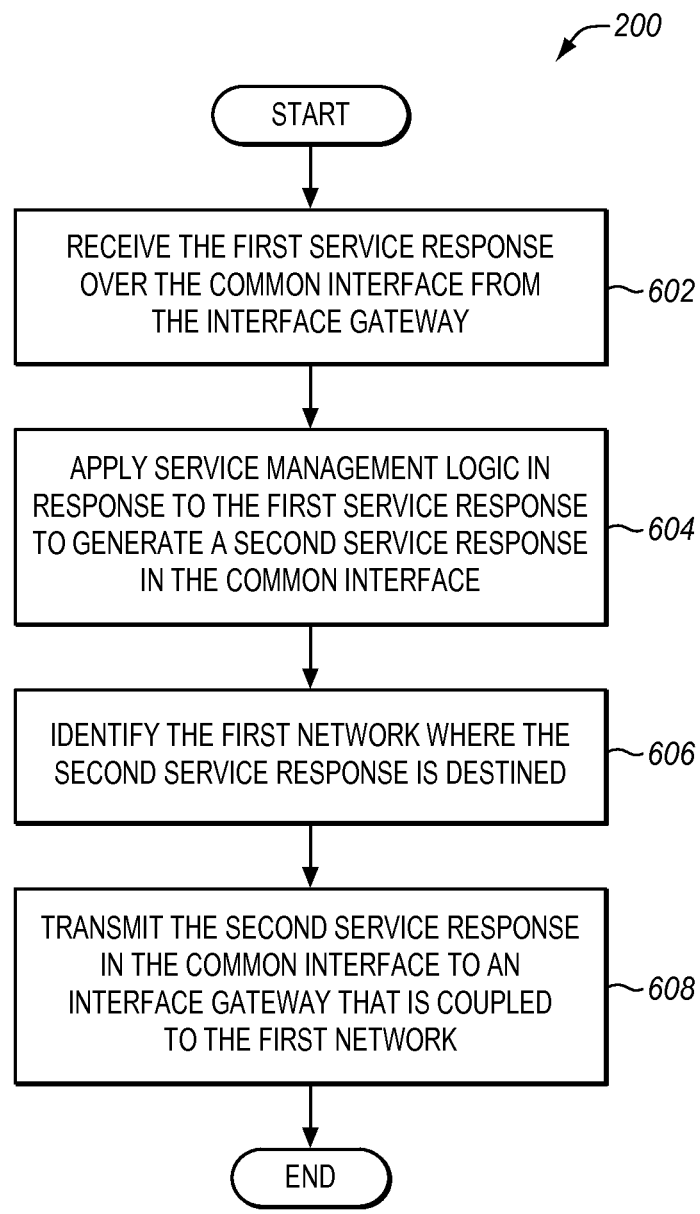

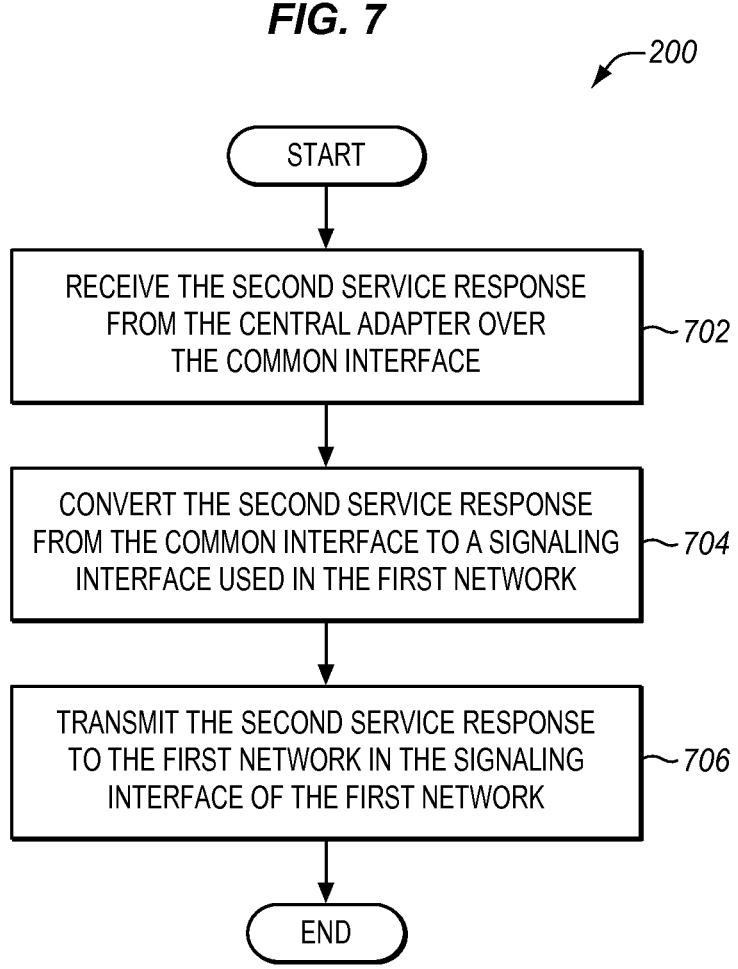

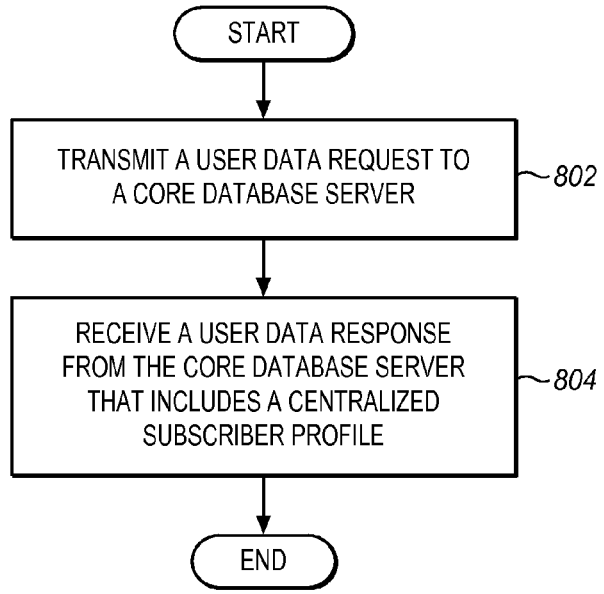
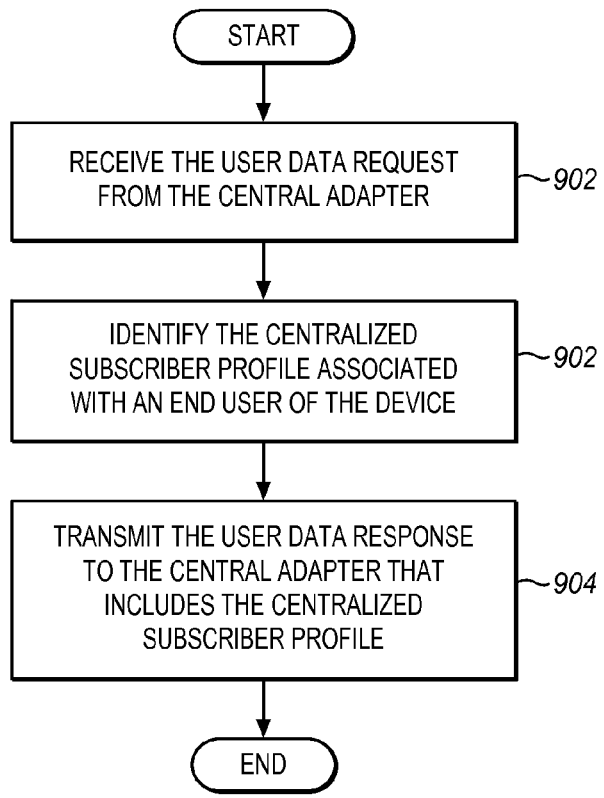

CENTRALIZED TELECOM SERVER FOR DIFFERENT TECHNOLOGY NETWORKS

FIELD OF THE INVENTION

The invention is related to the field of communications and, in particular, to a centralized telecommunications (telecom) server to broker services across different technology networks.

BACKGROUND

A Telecom Serving System (TSS) is one of the functions of a telecom network (wireline, wireless, internet, data, VoIP, etc) that allows devices to travel within the coverage area of the network and receive services. The function of a telecom serving system is to acquire the geographic location of the end user devices, and deliver calls, text messages, and other services to the devices at the appropriate location in the network. The location of the device is generally maintained in a subscriber server or database that stores a profile for the subscriber. For example, in a 2G or 3G cellular network, the subscriber profile may be stored in a Home Location Register (HLR) or a Visitor Location Register (VLR). In a 4G network, such as an IP Multimedia Subsystem (IMS) or a Long Term Evolution (LTE) network, the subscriber profile may be stored in a Home Subscriber Server (HSS).

In order to monitor the location of a device, telecom service standards in many networks require the device to inform the network whenever it moves from one location area to the next (also referred to as a location update procedure). When the device determines that it has moved to a new location area, the device sends a location update request to the network. The network then updates the subscriber profile for the subscriber based on the location update request. The location update procedure may also require that the device periodically report its location at a set time interval to the network. If the location of the device has changed, then the network updates the subscriber profile for the subscriber.

If the network subsequently receives a call or a text message (e.g., SMS) for the subscriber, the serving element in the network (e.g., MSC) is able to query the subscriber database (e.g., HLR or VLR) to determine the present location of the end user device. With the introduction of 3G and 4G networks, dual mode or multiple mode devices may be able to access different types of technology networks. For example, a device may be able to register with a 2G circuit-switched network, such as a CDMA network, while also being able to register with a 4G packet-switched network, such as an LTE network. In such an instance, the subscriber may roam from one technology network to another (e.g., from the 2G CDMA network to the 4G LTE network) while expecting seamless services. Presently, an HSS in an LTE network may not support subscriber registration in the CDMA network, while an HLR in the CDMA network may not support subscriber registration in the LTE network. Unfortunately, the different technology networks may not be able to communicate effectively to provide seamless services.

SUMMARY

Embodiments described herein provide for centralized service management and brokering across different technology networks. A centralized TSS is able to correlate service interfaces between the different telecom/internet networks for supporting roaming needs of subscribers and their devices. The service management is handled through a common interface that is independent from the interfaces of the networks. By using the common interface, an end user may receive the same service independent of the network where a subscriber is roaming. Also, the centralized TSS is able to broker services between or across the different technology networks.

One embodiment comprises a system for providing telecom/internet service management. The system includes a plurality of interface gateways each operable to communicate with a network through a signaling interface, where the networks are different technology networks. The system further includes a central adapter operable to provide service management for devices regardless of the signaling interfaces used in the networks. The system further includes a common interface connecting the interface gateways to the central adapter. A first interface gateway is operable to receive a first service request from a first network regarding an end user device over a signaling interface of the first network. The first service request may be for registration, location updates, call delivery, etc. The first interface gateway is further operable to convert the first service request from the signaling interface used in the first network to the common interface, and to transmit the first service request over the common interface to the central adapter.

The central adapter is operable to receive the first service request from the first interface gateway, to process service management logic to identify multiple services that trigger on the first service request, and to determine a sequence for providing the multiple services that trigger on the first service request. For each of the multiple services in the sequence, the central adapter is further operable to generate a second service request in the common interface based on the service management logic, to identify a second network where the second service request is destined, and to transmit the second service request over the common interface to a second interface gateway that is coupled to the second network.

The second interface gateway is operable to receive the second service request from the central adapter over the common interface, to convert the second service request from the common interface to a signaling interface used in the second network, and to transmit the second service request to the second network over the signaling interface of the second network.

The system described above thus correlates service requests between interfaces of different networks. The system may also correlate service responses in a similar way so that service management can be provided even though an end user may attempt to access services through multiple networks and/or multiple devices.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a flow chart illustrating the function of an interface gateway in processing a service response for service management in an exemplary embodiment.

FIG. 6 is a flow chart illustrating the function of a central adapter in processing a service response in an exemplary embodiment.

FIG. 7 is a flow chart illustrating the function of another interface gateway in providing a service response in an exemplary embodiment.

FIG. 8 is a flow chart illustrating the function of a central adapter in querying a core database server in an exemplary embodiment.

FIG. 9 is a flow chart illustrating the function of a core database server in providing a centralized subscriber profile to a central adapter in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
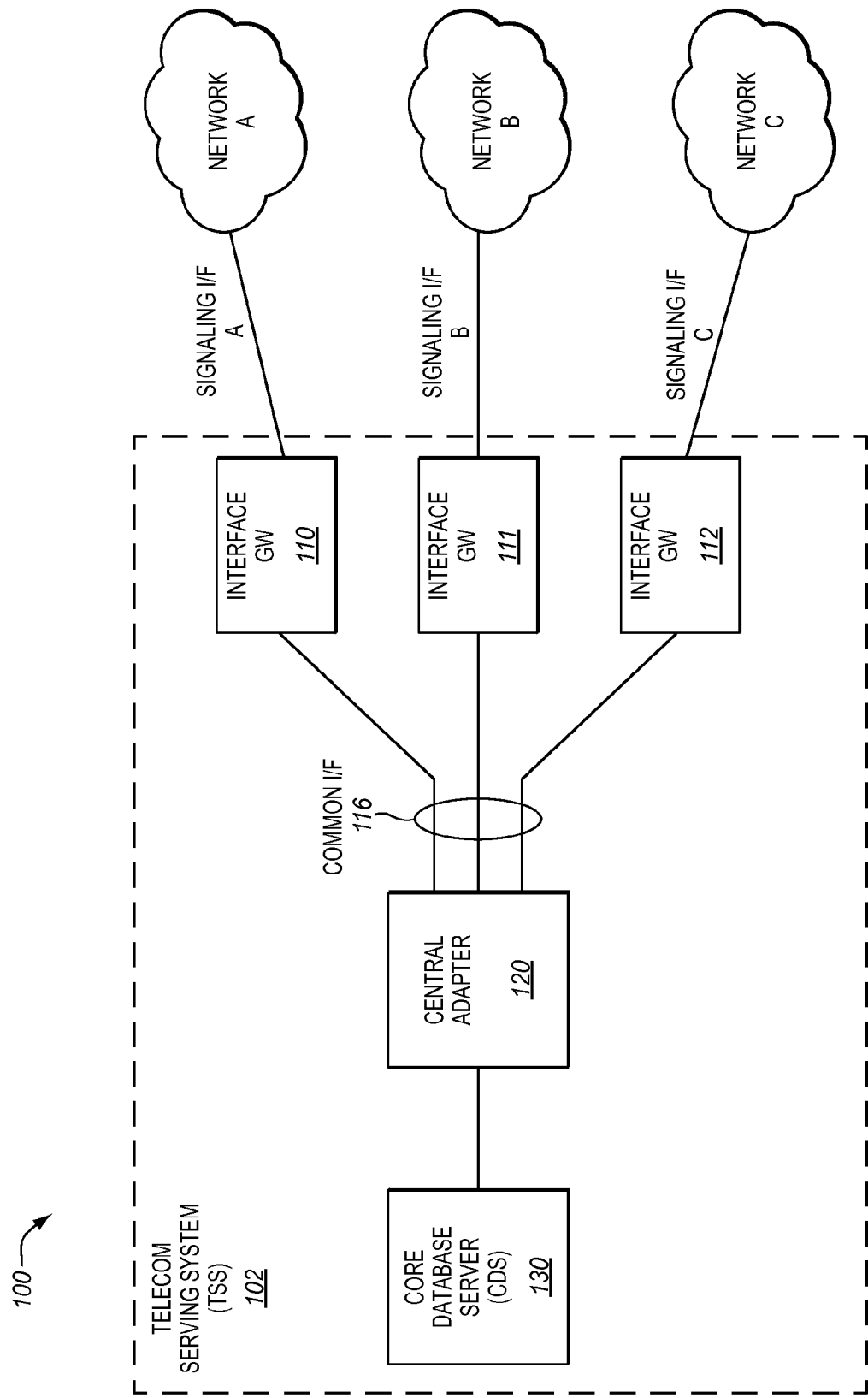
FIG. 1 illustrates a system for service management in an exemplary embodiment.

FIG. 1 illustrates a communication system 100 in an exemplary embodiment. Communication system 100 includes multiple telecommunication (telecom) or internet networks, which are illustrated as a network A, network B, and network C. Some examples of networks A, B, and C include wireline, wireless, internet, VoIP, WiMax, IMS, LTE, or any other web-based network. Networks A, B, and C, each represent a different technology network that provides service to end user devices (also referred to as User Equipment (UE)). When different technology networks are discussed herein, it refers to networks that use different signaling interfaces/protocols, different communication interfaces/protocols, or some other incompatible interfaces/protocols within their domains that inhibit direct communication between the networks. For example, network A may comprise a UMTS network, network B may comprise an LTE network, and network C may comprise an ANSI-41 network. Each of these networks in this example uses a different technology for communication.

According to the embodiments herein, networks A, B, and C each communicate with a centralized Telecom Serving System (TSS) 102. TSS 102 is a system that provides service management for networks regardless of the signaling interfaces (or APIs) used by the networks. TSS 102 includes a plurality of interface gateways 110-112 that each connects to a network. For example, interface gateway 110 connects to network A, interface gateway 111 connects to network B, and interface gateway 112 connects to network C. Interface gateway 110 is able to interface with network A using signaling interface A. Interface gateway 111 is able to interface with network B using signaling interface B. Interface gateway 112 is able to interface with network C using signaling interface C. TSS 102 may be expanded to include any number of interface gateways to communicate with new or added networks. Also, the interface gateways 110-112 may be referred to as Application Protocol Interface (API) gateways.

Each of interface gateways 110-112 comprises any system or server operate to translate signaling messages between a signaling interface of a network and a common interface 116 implemented within TSS 102. For example, signaling interface A of network A may comprise ANSI-41, GSM/UMTS, SIP, PHS, Restful, HTTP, Parlay, SMPP, MM7, or some other telecom or web-based interface. An interface gateway as described herein is able to convert or translate messages between one of those signaling interfaces and the common interface 116.

TSS 102 further includes a central adapter 120. Central adapter 120 comprises any system or server operable to implement service management to different technology networks. Central adapter 120 is able to implement service management regardless of the signaling interface used in the networks. Central adapter 120 is coupled to interface gateways 110-112 over the common interface 116. Common interface 116 is an interface that is generic to networks A-C, and is not tied to any specific signaling interface of any particular network.

TSS 102 further includes a core database server 130. Core database server 130 comprises any server or database operable to store centralized subscriber profiles for end users (e.g., telecom subscribers). The centralized subscriber profiles are interface-neutral, which means that they are not tied to a signaling interface of any particular technology network. Core database server 130 may also store subscriber profiles for end users that are interface-specific. For example, if an end user subscribes to service with a UMTS network and an ANSI-41 network, then core database server 130 may store a subscriber profile for the UMTS network and a subscriber profile for the ANSI-41 network.

Assume for this embodiment that an end user device or end user terminal (not shown) registers with one or more of networks A-C. As the device roams or moves within a network or between networks A-C, TSS 102 provides service management for the device. FIGS. 2-7 are flow charts illustrating a method 200 of providing service management by correlating between interfaces of different technology networks. The steps of method 200 will be described with reference to system 100 in FIG. 1, but those skilled in the art will appreciate that method 200 may be performed in other networks and systems. The steps of the flow charts described herein are not all inclusive and may include other steps not shown. The steps may also be performed in an alternative order.

Figure 2:
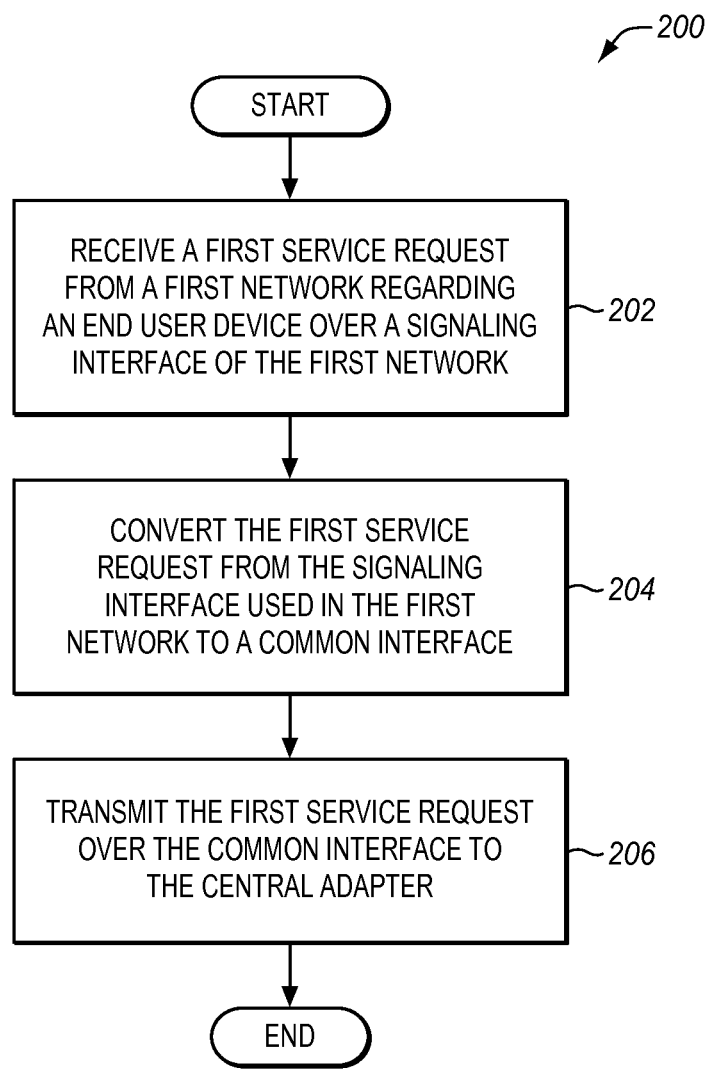
FIG. 2 is a flow chart illustrating the function of an interface gateway in processing a service request for service management in an exemplary embodiment.

FIG. 2 is a flow chart illustrating the function of an interface gateway in processing a service request for service management in an exemplary embodiment. This embodiment is described with reference to interface gateway 110 in FIG. 1. In step 202 of method 200, interface gateway 110 receives a first service request from network A regarding the end user device. The first service request is for service management for the device, so the first service request may also be referred to as a service management request or a telecom service management request. Service management may be needed for a variety of reasons, such as call routing and delivery, terminal registration, message routing and delivery, and terminal status update for message service. Thus, the first service request may be to update the location of a device, to register or de-register a device, to request routing information for a call/message, etc.

Interface gateway 110 receives the first service request over the signaling interface of telecom network A, which is signaling interface A. For example, if network A comprises a UMTS network, then signaling interface A may comprise a MAP interface. In step 204, interface gateway 110 converts the first service request from the signaling interface (signaling interface A) used in network A to the common interface 116. For instance, for each function or operation in signaling interface A, there may be a corresponding function or operation in the common interface 116. Thus, interface gateway 110 may map the function (and its corresponding parameters) for signaling interface A to a function in the common interface 116. Some exemplary functions are described later in Table 1. Interface gateway 110 then transmits the first service request in the common interface 116 to central adapter 120 in step 206.

Figure 3:
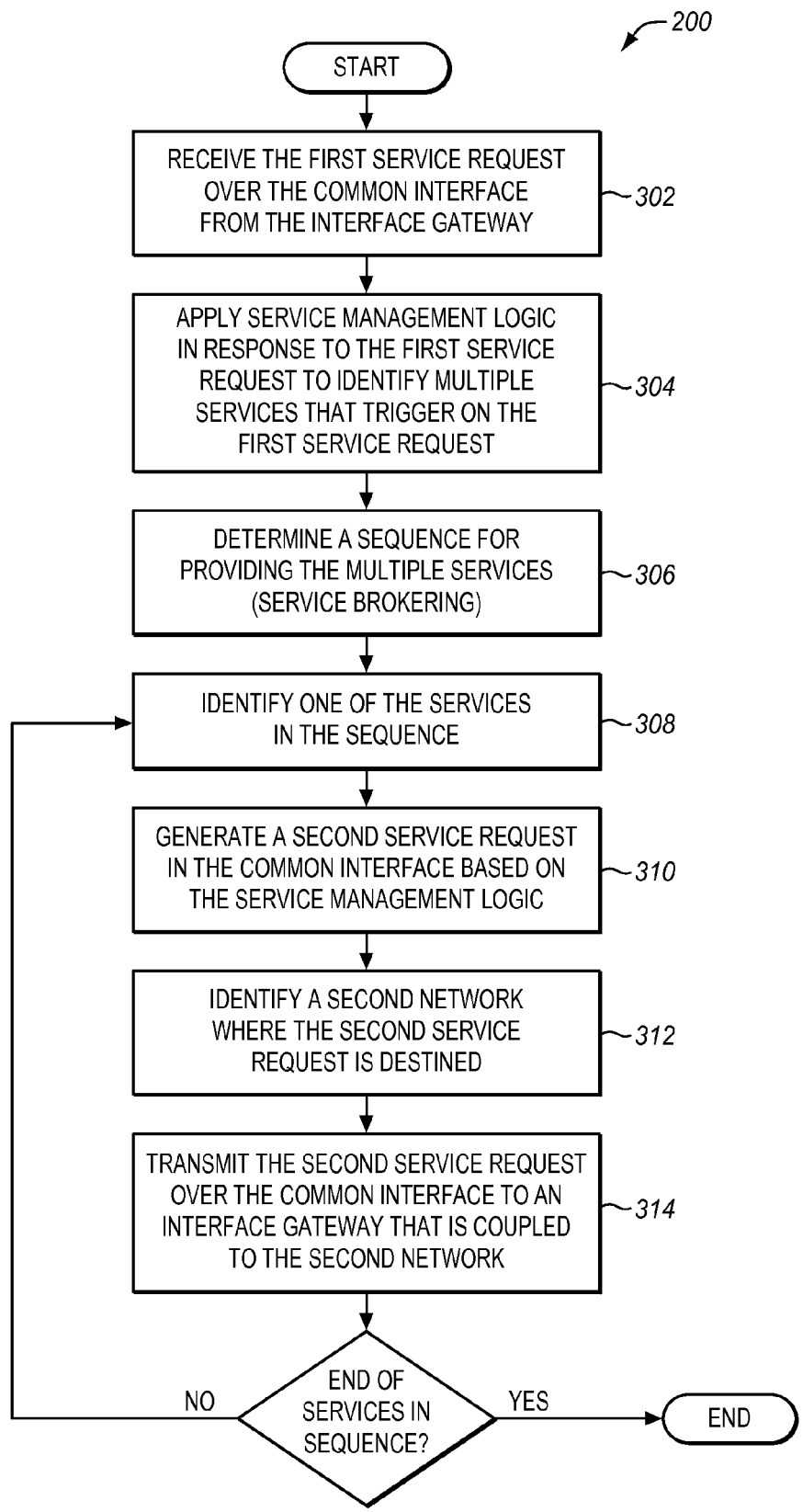
FIG. 3 is a flow chart illustrating the function of a central adapter in processing a service request in an exemplary embodiment.

FIG. 3 is a flow chart illustrating the function of central adapter 120 in processing a service request in an exemplary embodiment. In step 302, central adapter 120 receives the first service request over the common interface 116 from interface gateway 110. In step 304, central adapter 120 processes service management logic in response to the first service request to identify multiple services that trigger on the first service request. Because multiple services may trigger on the first service request, central adapter 120 is able to broker these services. As part of brokering, central adapter 120 determines a sequence for providing the multiple services that trigger on the first service request in step 306.

Central adapter 120 then operates as follows on the sequence of services. Central adapter 120 first identifies one of the services in the sequence in step 308 (starting with the first service in the sequence). Central adapter 120 then generates a second service request in the common interface 116 based on the service management logic in step 310. The service management logic is defined for the common interface 116 that is generic to each of the networks A-C. Thus, the service management logic operates on the functions defined for the common interface 116.

The service management provided herein is across networks using different technologies. In other words, TSS 102 is used to map signaling between two different technology networks for serving the device. Thus, the second service request is intended for a different technology network than the network that sent the first service request. For example, the network that sent the first service request may be a UMTS network, while the second service request is intended (destined) for an ANSI-41 network. After generating the second service request, central adapter 120 identifies a second network where the second service request is destined in step 312. Assume for this embodiment that the other network where the second service request is destined is network C. In step 314, central adapter 120 transmits the second service request over the common interface 116 to a second gateway 112 that is coupled to network C.

Central adapter 120 operates as described in steps 308-314 for each of the services in the sequence until each of the services in the sequence have been processed (in order).

Figure 4:
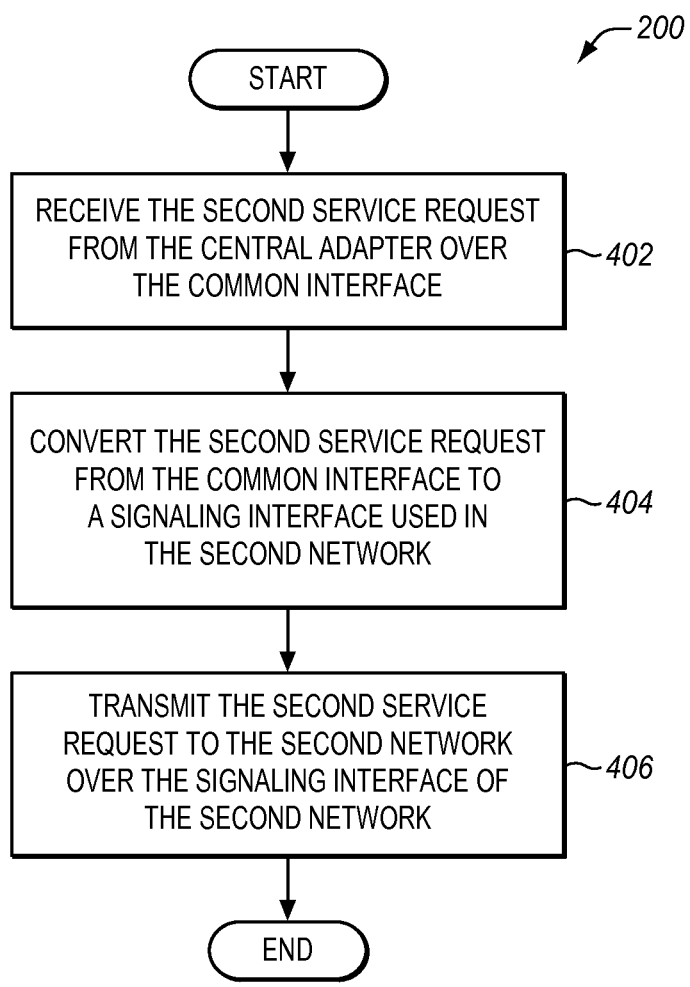
FIG. 4 is a flow chart illustrating the function of another interface gateway in processing a service request in an exemplary embodiment.

FIG. 4 is a flow chart illustrating the function of another interface gateway in processing a service request in an exemplary embodiment. This embodiment is described with reference to interface gateway 112 in FIG. 1, which is coupled to network C. In step 402 of method 200, interface gateway 112 receives the second service request from central adapter 120 over the common interface 116. In step 404, interface gateway 112 converts the second service request from the common interface 116 to the signaling interface used by network C, which is signaling interface C. In step 406, interface gateway 112 transmits the second service request to network C over signaling interface C.

Network C in the above embodiment may then process the second service request, and provide a service response. For example, if the second service request is requesting routing information to a device that is roaming in network C, then network C may send a service response back to TSS 102 indicating the routing information. Assume for the following embodiment that network C (through its network elements, such as an MSC, VLR, etc) processes the second service request to generate a service response (referred to as a first service response). FIGS. 5-7 are flow charts further illustrating service management for a service response.

FIG. 5 is a flow chart illustrating the function of an interface gateway in processing a service response for service management in an exemplary embodiment. This embodiment is described with reference to interface gateway 112 in FIG. 1. In step 502 of method 200, interface gateway 112 receives the first service response from network C over the signaling interface of network C, which is signaling interface C. In step 504, interface gateway 112 converts the first service response from the signaling interface (signaling interface C) used in network C to the common interface 116. In step 506, interface gateway 112 transmits the first service response over the common interface 116 to central adapter 120.

FIG. 6 is a flow chart illustrating the function of central adapter 120 in processing a service response in an exemplary embodiment. In step 602, central adapter 120 receives the first service response over the common interface 116 from interface gateway 112. In step 604, central adapter 120 applies service management logic responsive to the first service response to generate a second service response in the common interface 116. Central adapter 120 then identifies a network where the second service response is destined in step 606. Assume for this embodiment that the network where the second service response is destined is network A. In step 608, central adapter 120 transmits the second service response to interface gateway 110 that is coupled to network A over the common interface 116.

FIG. 7 is a flow chart illustrating the function of another interface gateway in providing a service response in an exemplary embodiment. This embodiment is described with reference to interface gateway 110 in FIG. 1. In step 702 of method 200, interface gateway 110 receives the second service response from central adapter 120 over the common interface 116. In step 704, interface gateway 110 converts the second service response from the common interface 116 to the signaling interface used by network A, which is signaling interface A. In step 706, interface gateway 110 transmits the second service response to network A in the signaling interface used by network A.

FIGS. 2-7 describe how TSS 102 is able to map service management requests/responses across different technology networks. TSS 102 receives a service request from network A in signaling interface A, and converts the service request to signaling interface C of network C. In doing so, TSS 102 uses a common interface 116 and associated service management logic. TSS 102 also receives a service response from network C in signaling interface C, and converts the service response to a signaling interface A of network A. Thus, no matter where the end user device happens to roam, TSS 102 is able to provide service management by translating service requests/responses between the common interface 116 and the signaling interfaces used by the networks. The conversion performed by TSS 102 is transparent to the networks.

In the embodiment in FIGS. 2-7, central adapter 120 contacts network C in order to respond to the first service request from network A. There may be instances where central adapter 120 is able to handle the service request without contacting another network. For example, when authenticating an end user device, central adapter 120 may only need to communicate with core database server 130 without contacting another network. Thus, central adapter 120 may be able to generate the service response in the common interface 116 without sending a service request to another network.

Also, in instances where correlation of interfaces is not needed, interface gateways 110-112 may operate as an interface-specific adapter (ISA). An ISA adapts logic that is specific to a signaling interface of a network. For example, if interface gateway 110 is connected to a UMTS network, then interface gateway 110 may include an ISA that implements MAP-specific service logic. There is no need to contact central adapter 120 in these instances as the ISA can handle requests that are interface-specific.

In applying the service management logic in the above embodiments, central adapter 120 may retrieve a centralized subscriber profile associated with the end user of the device, which is described further in FIGS. 8-9. FIG. 8 is a flow chart illustrating the function of central adapter 120 in querying core database server 130 in an exemplary embodiment. In step 802, central adapter 120 transmits a user data request to core database server 130. The user data request is for a centralized subscriber profile (or portion of the centralized subscriber profile) associated with an end user of the device. In response to the user data request, central adapter 120 receives a user data response from core database server 130 that includes the centralized subscriber profile in step 804. In applying service management logic, central adapter 120 may process the centralized subscriber profile received from core database server 130.

FIG. 9 is a flow chart illustrating the function of core database server 130 in providing the centralized subscriber profile to central adapter 120 in an exemplary embodiment. In step 902, core database server 130 receives the user data request from central adapter 120. The user data request may include an identifier for the end user of the device, such as an International Mobile Subscriber Identity (IMSI). In step 904, core database server 130 identifies the centralized subscriber profile associated with the end user of the device. In step 906, core database server 130 transmits the user data response to central adapter 120 that includes the centralized subscriber profile, or a portion of the centralized subscriber profile.

Core database server 130 may store interface-specific subscriber profiles for an end user in addition to the centralized subscriber profile. Thus, interface gateways 110-112 may communicate directly with core database server 130 to access the subscriber profiles that are interface-specific.

As described above, interface gateways 110-112 (see FIG. 1) are able to translate service requests/responses between signaling interfaces of the networks and the common interface 116. There are at least four types of functions/operations defined for the common interface 116. One type of function is a location registration management function, which includes Register Terminal (RT), Deregister Terminal (DT), and Cancel Terminal Register (CTR). Another type of function is a call routing and delivery function, which includes Request Location (RL) and Request Route Information (RRI). Another type of function is a message (e.g., SMS) routing and delivery function, which includes Request Location for Messages, and Request Route Information for Messages. Another type of function is a terminal status notification function for message (e.g., SMS) delivery, which includes Report Terminal Status for Messages and Notify Terminal Status Change for Messages. There may be other types of functions for the common interface 116 that are not described herein.

Interface gateways 110-112 are able to map the functions for the common interface 116 to functions in the signaling interfaces of networks A-C, and vice-versa. For example, Table 1 indicates some exemplary mappings from the common interface 116 to ANSI-41, GSM/UMTS, and SIP. These common functions build centralized bridges between interface gateways 110-112 and central adapter 120 to realize centralized service management among different technology networks.

TABLE 1

| | Common Function | ANSI-41 function | GSM/UMTS function | SIP function | Restful function |
|---|---|---|---|---|---|
| Location registration management functions | Register Terminal | Reg. Notification | Update location Update GPRS location | REGISTER (Location lookup) | Post_Registration_Notification Put_Registration_Notification |
| | Deregister Terminal | MS Inactive | Purge MS | | Post_Inactive_Notificaton Post_Inactive_Terminal |
| | Cancel Terminal Reg. | Reg. Cancellation | Cancel location | | Post_Registration_Cancel Post_Terminal_Cancel Delete_Registration Delete_Terminal_Registration |
| Call routing & delivery functions | Request Location | Location request | Send routing info. | INVITE | Get_Location Get_Location_Information |
| | Request Route Info. | Routing request | Provide roaming num. | | Get_Routing_Information Get_Roaming_Information |

TABLE 1-continued

| Common Function | ANSI-41 function | GSM/UMTS function | SIP function | Restful function |
|---|---|---|---|---|
| Message routing & delivery functions | Request Location for Messages | SMS request | Send routing info for GPRS/SM | Get_messaging_Information |
| | Request Route Info. for Messages | SMS request | | Get_message_routing_Information |
| Terminal status notification functions for message delivery | Report Terminal Status for Messages | (Reg. Notification) | Ready for SM Report SM delivery status (Failure report) | Post_Terminal_Notification |
| | Notify Terminal Status Change for Messages | SMS notification | Note MS GPRS present Alert service center | Post_Terminal_Status Post_Notification |

Mapping across multiple interfaces may be used in one or more of the following scenarios. The first scenario is for call delivery (roaming subscriber). Correlation of interfaces is performed in TSS 102 if a called party number is assigned to an end user (not just a terminal), and if the signaling interface to which the called party number belongs is different from that used in the network where the user is presently roaming. A location request from one type of network is achieved by a routing number request to another type of network.

A second scenario is call delivery (roaming devices with a multi mode phone). Correlations of interfaces is performed in TSS 102 if a call is delivered to a dual mode phone when the dual mode phone is roaming in a network to which the called party number does not belong.

A third scenario is a location update across different networks by a dual mode phone. Correlation of interfaces is performed in TSS 102 when a dual mode phone moves from one type of network to another. In this case, a location update request comes from one interface, while TSS 102 issues a registration cancellation request to another type of network.

A fourth scenario is message delivery. Correlation of interfaces may be performed when a user receives a message (e.g., SMS) in one network, while a user is roaming in another network.

A fifth scenario is data level mapping. Correlation of interfaces is performed in TSS 102 when an end user subscribes to multiple interfaces and when some central type of information is updated. For example, call forwarding number and call waiting feature activation status fields are such common type of information. Assume, for example, that a call forwarding number update request is received from a SIP terminal. If the end user also has a UMTS phone and if he/she decides to make the call forwarding numbers consistent across telecom interfaces, then the update request should also update the call forwarding number for the UMTS phone. If the UMTS phone is active somewhere, the information is downloaded to the UMTS VLR where the UMTS phone registers.

EXAMPLES

Figure 10:
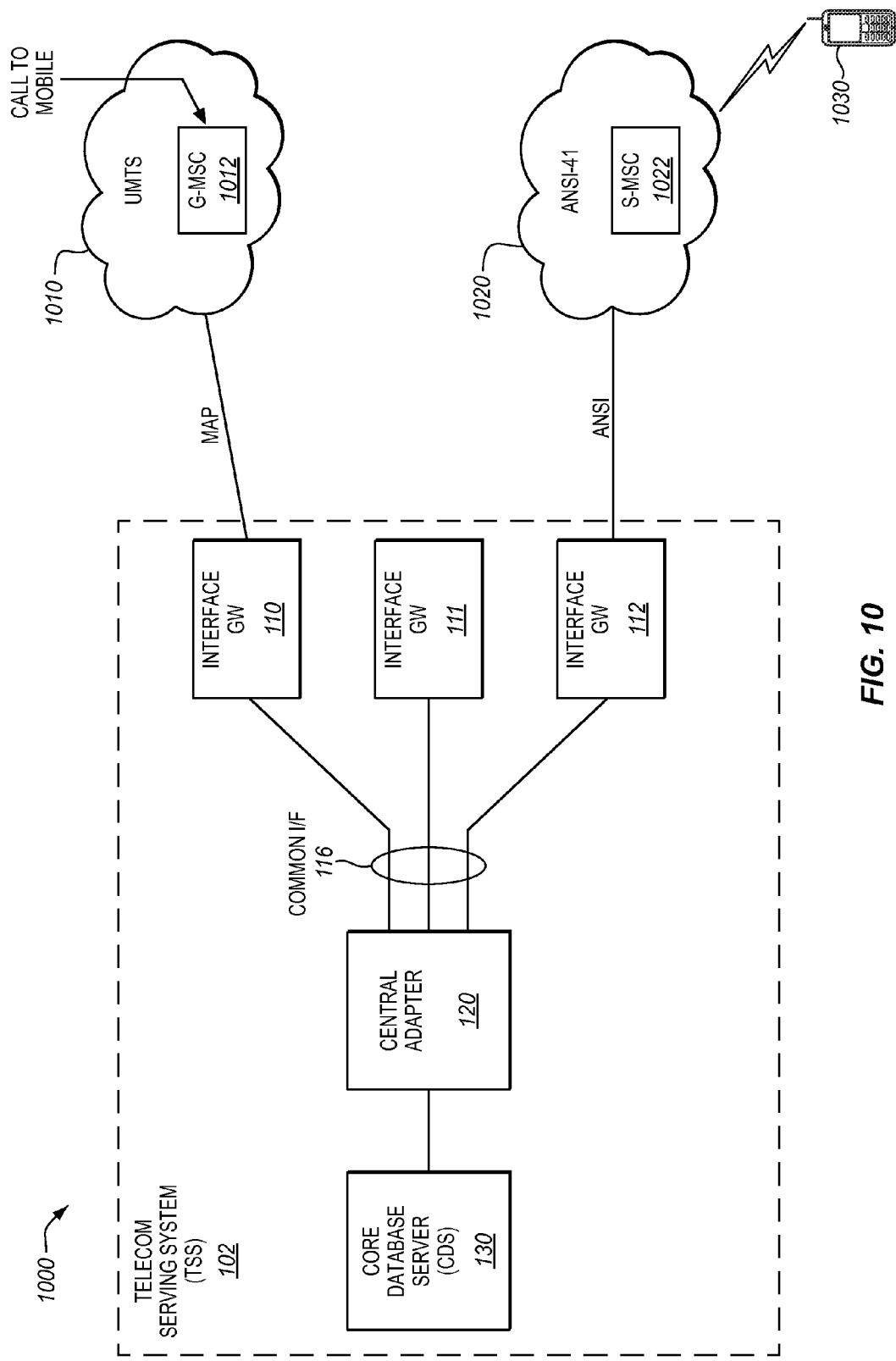
FIG. 10 illustrates a communication system in another exemplary embodiment.

FIG. 10 illustrates a communication system 1000 in another exemplary embodiment. Communication system 1000 is similar to the system 100 in FIG. 1, except that TSS 102 is connected to two networks. One network is a UMTS network 1010, while the other network is an ANSI-41 network 1020. UMTS network 1010 is shown as including a gateway-MSC (G-MSC) 1012, although it may include multiple other network elements. ANSI-41 network 1020 is shown as including a serving-MSC (S-MSC) 1022, although it may include multiple other network elements. G-MSC 1012 is coupled to interface (API) gateway 110 in TSS 102 via a MAP interface. S-MSC 1022 is coupled to interface (API) gateway 112 in TSS 102 via an ANSI interface.

Assume for this example that an end user device 1030 subscribes to service with UMTS network 1010 (i.e., has a directory number for the UMTS network), but is roaming in ANSI-41 network 1020. Further assume that a call is received in UMTS network 1010 for device 1030. G-MSC 1012 receives the call to device 1030. Because device 1030 is not located in UMTS network 1010 but is roaming in ANSI-41 network 1020, UMTS network 1010 is not able to route the call to device 1030. Thus, UMTS network 1010 may access TSS 102 to determine how to route the call (i.e., provide service management).

Figure 11:
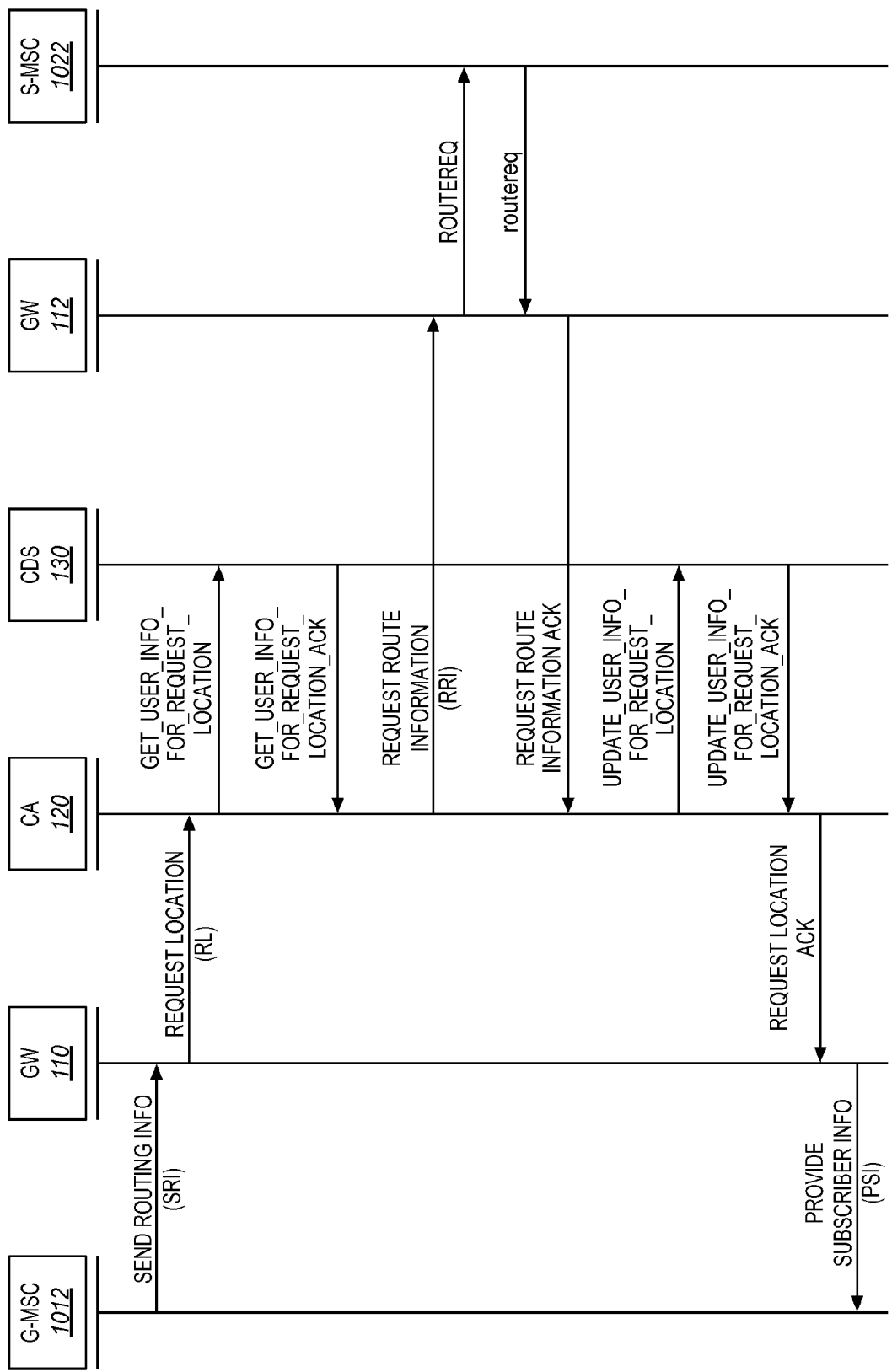
FIG. 11 is a message diagram illustrating centralized service management in an exemplary embodiment.

FIG. 11 is a message diagram illustrating centralized service management in an exemplary embodiment. To start, G-MSC 1012 sends a MAP Send Routing Information (SRI) message to interface gateway 110. Interface gateway 110 converts the MAP SRI message to a "Request Location" message for the common interface 116. Interface gateway 110 then sends the Request Location message to central adapter 120. Central adapter 120 may not presently store a centralized subscriber profile for the end user of device 1030. Thus, central adapter 120 sends a user data request (Get_User_Info_for_Request_Location) to core database server (CDS) 130 requesting the centralized subscriber profile for the end user of device 1030. The centralized subscriber profile includes location information for device 1030 in ANSI-41 network 1020. Core database server 130 then sends a user data response (Get_User_Info_for_Request_Location_Ack) to central adapter 120 that includes the centralized subscriber profile (or a portion thereof). Central adapter 120 processes the centralized subscriber profile to identify the roaming location of device 1030, which is in ANSI-41 network 1020. Central adapter 120 applies service management logic to generate a "Request Route Information" message for the common interface 116, and sends the Request Route Information message to interface gateway 112 that is coupled to ANSI-41 network 1020. Interface gateway 112 converts the Request Route Information message to an ANSI Route Request (ROUTEREQ) message, and sends the ROUTEREQ message to S-MSC 1022 in ANSI-41 network 1020.

S-MSC 1022 process the ROUTEREQ message to determine routing information for the call to device 1030. S-MSC 1022 then generates an ANSI Route Request response (routereq) message that includes the routing information, and sends the routereq message to interface gateway 112. Interface gateway 112 converts the ANSI routereq message to a "Request Route Information Ack" message for the common interface 116. Interface gateway 112 then sends the Request Route Information Ack message to central adapter 120.

When receiving the routing information in the Request Route Information Ack message, central adapter 120 may update the information stored in core database server 130. Thus, central adapter 120 sends a data update request (Update_User_Info_for_Request_Location) to core database server 130 with the information to update the centralized subscriber profile for the end user of device 1030. The centralized subscriber profile includes location information for device 1030 in ANSI-41 network 1020. Core database server 130 then updates the centralized subscriber profile based on the information in the data update request, and sends a data update response (Update_User_Info_for_Request_Location_Ack) to central adapter 120.

Central adapter 120 then generates a "Request Location Ack" message for the common interface 116 that includes the routing information for the call, and sends the Request Location Ack message to interface gateway 110 that is coupled to UMTS network 1010. Interface gateway 110 converts the Request Location Ack message to a MAP Provide Subscriber Information (PSI) message, and sends the PSI message to G-MSC 1012 in UMTS network 1010. The PSI message includes routing information for the call, so G-MSC 1012 may initiate routing of the call to device 1030 based on the routing information.

Figure 12:
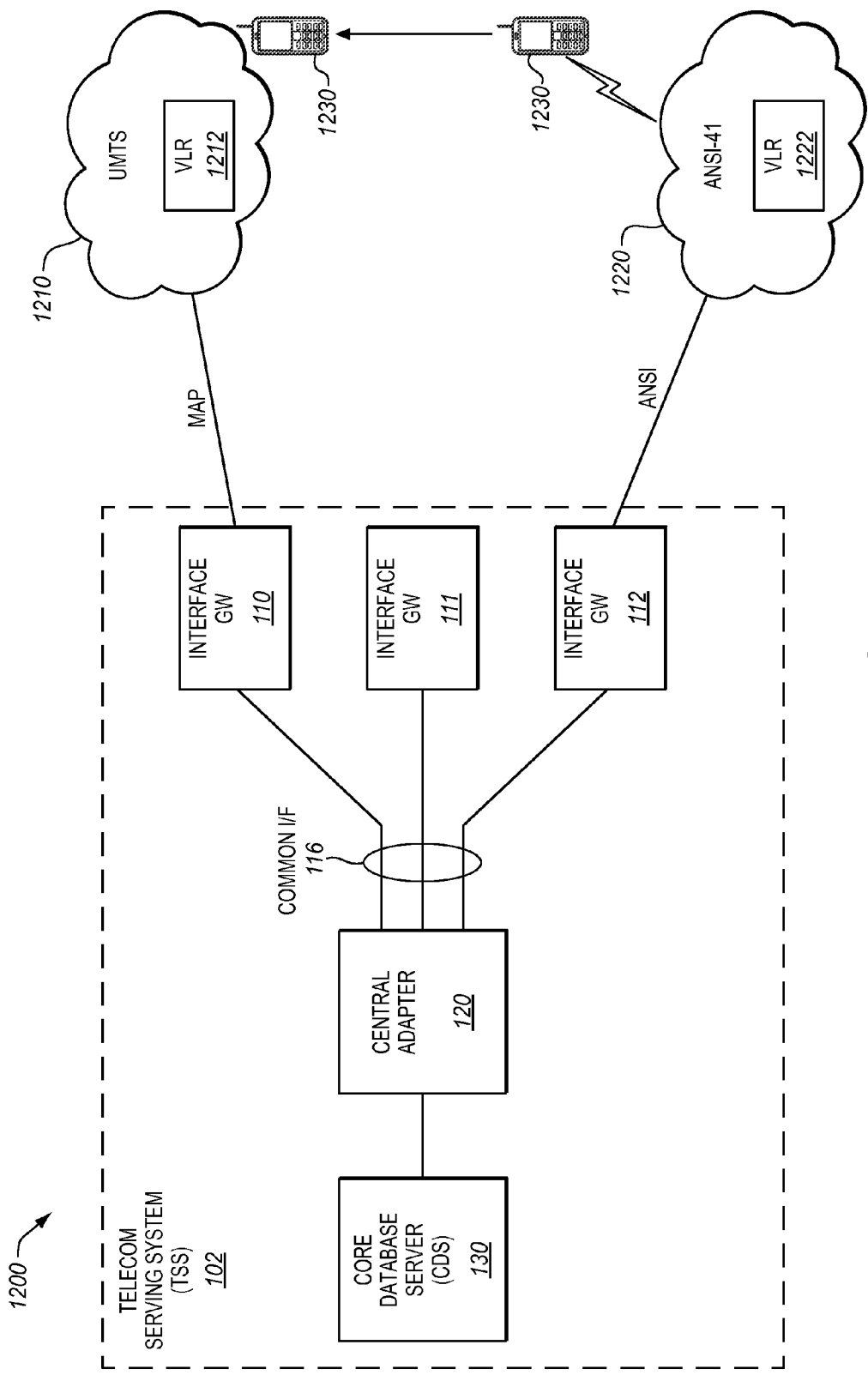
FIG. 12 illustrates a communication system in another exemplary embodiment.

FIG. 12 illustrates a communication system 1200 in another exemplary embodiment. Communication system 1200 is similar to the system 1000 in FIG. 10 in that TSS 102 is connected to two networks. One network is a UMTS network 1210, while the other network is an ANSI-41 network 1220. UMTS network 1210 is shown as including a visited location register (VLR) 1212, although it may include multiple other network elements. ANSI-41 network 1220 is also shown as including a VLR 1222, although it may include multiple other network elements.

Assume for this example that a device 1230 is dual mode and is roaming from ANSI-41 network 1220 to UMTS network 1210. When device 1230 roams into UMTS network 1210, it attempts to register with UMTS network 1210. At the same time, it does not de-register with ANSI-41 network 1220 which can cause problems. Thus, TSS 102 may be used to de-register device 1230 with ANSI-41 network 1220 (i.e., provide service management).

Figure 13:
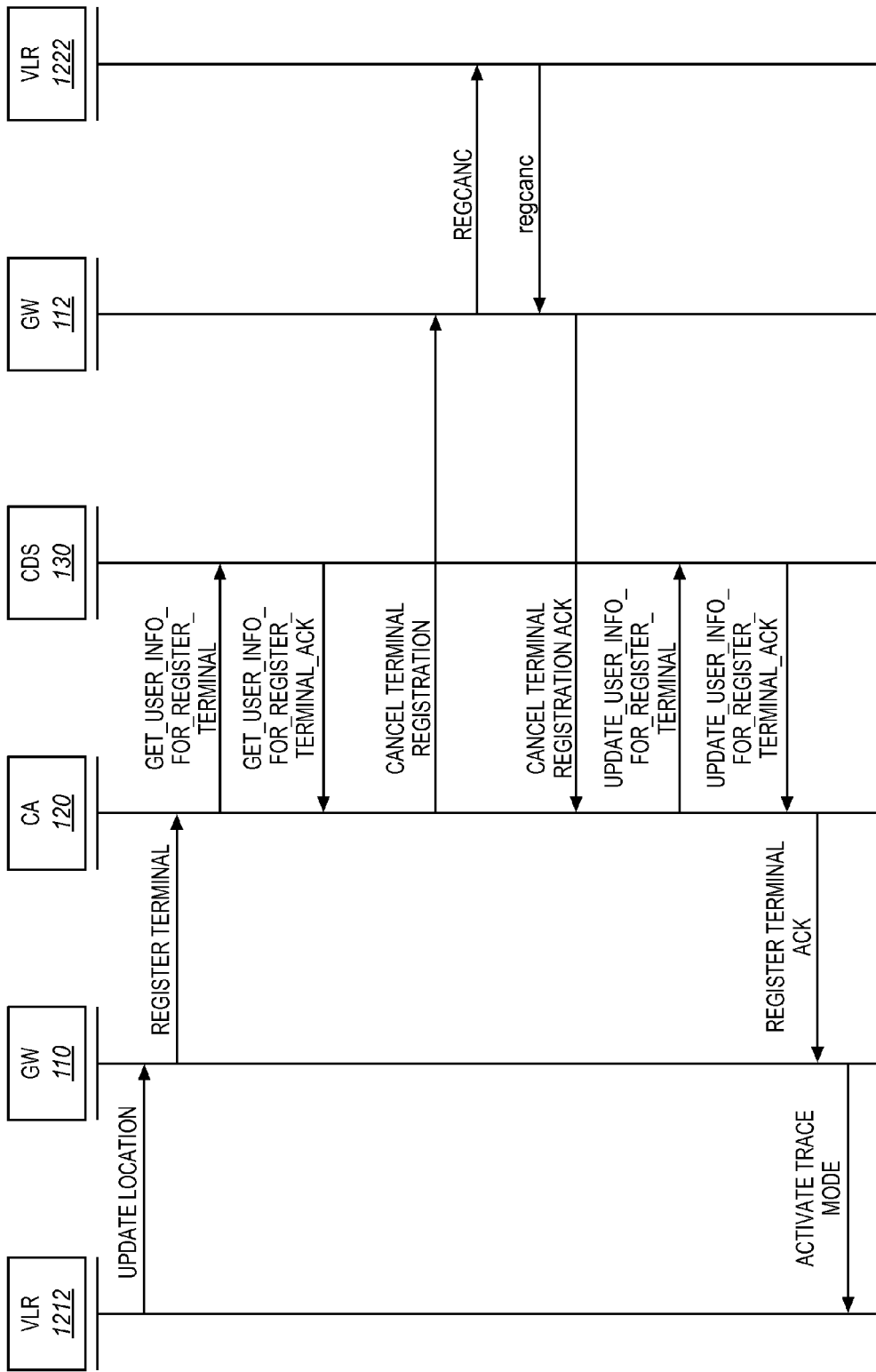
FIG. 13 is a message diagram illustrating centralized service management in an exemplary embodiment.

FIG. 13 is a message diagram illustrating centralized service management in an exemplary embodiment. When device 1230 attempts to register with UMTS network 1210, VLR 1212 updates the location of device 1230. Thus, VLR 1212 sends a MAP Update Location message to interface gateway 110. Interface gateway 110 converts the MAP Update Location message to a "Register Terminal" message for the common interface 116. Interface gateway 110 then sends the Register Terminal message to central adapter 120. Central adapter 120 may not presently store a centralized subscriber profile for the end user of device 1230. Thus, central adapter 120 sends a user data request (Get_User_Info_for_Register_Terminal) to core database server (CDS) 130 requesting the centralized subscriber profile for the end user of device 1230. Core database server 130 then sends a user data response (Get_User_Info_for_Register_Terminal_Ack) to central adapter 120 that includes the centralized subscriber profile (or a portion thereof). Central adapter 120 processes the centralized subscriber profile to determine that device 1230 is no longer in the service area of ANSI-41 network 1220. Therefore, central adapter 120 generates a "Cancel Terminal Registration" message for the common interface 116, and sends the Cancel Terminal Registration message to interface gateway 112 that is coupled to ANSI-41 network 1220. Interface gateway 112 converts the Cancel Terminal Registration message to an ANSI Register Cancel (REGCANC) message, and sends the REGCANC message to VLR 1222 in ANSI-41 network 1220.

VLR 1222 process the REGCANC message and terminates the registration for device 1230. VLR 1222 then generates an ANSI Register Cancel response (regcanc) message, and sends the regcanc message to interface gateway 112. Interface gateway 112 converts the ANSI regcanc message to a "Cancel Terminal Registration Ack" message for the common interface 116. Interface gateway 112 then sends the Cancel Terminal Registration Ack message to central adapter 120.

Central adapter 120 may update the information stored in core database server 130 in response to the Cancel Terminal Registration Ack message. Thus, central adapter 120 sends a data update request (Update_User_Info_for_Register_Terminal) to core database server 130 with the information to update the centralized subscriber profile for the end user of device 1230. Core database server 130 then updates the centralized subscriber profile based on the information in the data update request, and sends a data update response (Update_User_Info_for_Register_Terminal_Ack) to central adapter 120.

Central adapter 120 then generates a "Register Terminal Ack" message for the common interface 116, and sends the Register Terminal Ack message to interface gateway 110 that is coupled to UMTS network 1210. Interface gateway 110 converts the Register Terminal Ack message to a MAP Activate Trace Mode message, and sends the Activate Trace Mode message to VLR 1212 in UMTS network 1210. VLR 1212 may then perform some MAP-specific functions to update the location of device 1230 within UMTS network 1210, which are not shown for the sake of brevity.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are functional when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodi-

We claim:

1. A system comprising:
    a plurality of interface gateways each operable to communicate with a network through a signaling protocol, wherein the networks are different technology networks;
    a central adapter operable to broker services for end user devices regardless of the signaling protocol used in the networks; and
    a common interface connecting the interface gateways to the central adapter, wherein the common interface is generic to the networks;
    wherein a first interface gateway is operable to receive a first service request from a first network regarding an end user device, to convert the first service request from a signaling protocol used in the first network to the common interface, and to transmit the first service request to the central adapter over the common interface;
    wherein the central adapter is further operable to process service management logic to identify multiple services that trigger on the first service request, and to determine a sequence for providing the multiple services that trigger on the first service request;
    for each of the multiple services in the sequence, the central adapter is further operable to generate a second service request in the common interface based on the service management logic, to identify a second network where the second service request is destined, and to transmit the second service request over the common interface to a second interface gateway that is coupled to the second network;
    wherein the second interface gateway is operable to convert the second service request from the common interface to a signaling interface used in the second network, and to transmit the second service request to the second network in the signaling interface of the second network;
    wherein the second interface gateway is further operable to receive a first service response from the second network, to convert the first service response from the signaling interface used in the second network to the common interface, and to transmit the first service response over the common interface to the central adapter.

2. The system of claim 1 wherein:
    the central adapter is further operable to apply the service management logic to generate a second service response in the common interface, to identify the first network where the second service response is destined, and to transmit the second service response over the common interface to the first interface gateway that is coupled to the first network.

3. The system of claim 2 wherein:
    the first interface gateway is further operable to receive the second service response from the central adapter over the common interface, to convert the second service response from the common interface to the signaling interface used in the first network, and to transmit the second service response to the first network over the signaling interface of the first network.

4. The system of claim 1 further comprising a core database server operable to store centralized subscriber profiles for end users, where the centralized subscriber profiles are interface-neutral, wherein:
    the central adapter is further operable to transmit a user data request to the core database server in response to processing the first service request in the common interface, and to receive a user data response from the core database server that includes a centralized subscriber profile associated with an end user of the end user device;
    the central adapter is further operable to process the centralized subscriber profile when processing the service management logic to generate the second service request.

5. The system of claim 4 wherein:
    the core database server is further operable to store subscriber profiles for end users that are interface-specific.

6. The system of claim 5 wherein:
    each interface gateway is further operable to communicate directly with the core database server to access the subscriber profiles that are interface-specific.

7. A method comprising:
    receiving a first service request from a first network regarding an end user device in a first interface gateway of a centralized telecom serving system;
    converting the first service request from a signaling interface used in the first network to a common interface defined within the centralized telecom serving system;
    transmitting the first service request over the common interface to a central adapter in the centralized telecom serving system;
    processing service management logic in the central adapter to identify multiple services that trigger on the first service request;
    determining a sequence for providing the multiple services that trigger on the first service request;
    for each of the multiple services in the sequence:
        generating a second service request in the common interface based on the service management logic;
        identifying a second network where the second service request is destined; and
        transmitting the second service request over the common interface to a second interface gateway that is coupled to the second network;
    wherein the common interface is generic to the first and second networks;
    receiving, in the second interface gateway, the second service request from the central adapter over the common interface;
    converting the second service request from the common interface to a signaling interface used in the second network;
    transmitting the second service request from the second interface gateway to the second network over the signaling interface of the second network;
    receiving, in the second interface gateway, a first service response from the second network;
    converting the first service response from the signaling interface used in the second network to the common interface; and
    transmitting the first service response over the common interface to the central adapter.

8. The method of claim 7 further comprising:
    receiving, in the central adapter, the first service response over the common interface from the second interface gateway;
    applying the service management logic in the central adapter to generate a second service response in the common interface;
    identifying the first network where the second service response is destined; and transmitting the second service response from the central adapter over the common interface to the first interface gateway that is coupled to the first network.

9. The method of claim 8 further comprising:

receiving, in the first interface gateway, the second service response from the central adapter over the common interface;

converting the second service response from the common interface to the signaling interface used in the first network; and transmitting the second service response from the first interface gateway to the first network over the signaling interface of the first network.

10. The method of claim 7 further comprising:

transmitting a user data request from the central adapter to a core database server in response to processing the first service request;

receiving a user data response in the central adapter from the core database server that includes a centralized subscriber profile associated with an end user of the device; and processing the centralized subscriber profile in the central adapter when applying the service management logic to generate the second service request.

11. The method of claim 10 further comprising:

storing subscriber profiles in the core database server for end users that are interface-specific.

* * * * *